US011051178B2

(12) United States Patent
Lee et al.

(10) Patent No.: US 11,051,178 B2
(45) Date of Patent: Jun. 29, 2021

(54) METHOD AND DEVICE FOR APPLYING VALUE ON BASIS OF COVERAGE EXTENSION LEVEL

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/717,152

(22) Filed: Dec. 17, 2019

(65) Prior Publication Data

US 2020/0128411 A1 Apr. 23, 2020

Related U.S. Application Data

(63) Continuation of application No. 15/562,700, filed as application No. PCT/KR2016/003570 on Apr. 6, 2016, now Pat. No. 10,555,182.

(Continued)

(51) Int. Cl.
*H04W 48/16* (2009.01)
*H04W 16/26* (2009.01)
(Continued)

(52) U.S. Cl.
CPC ............. *H04W 16/26* (2013.01); *H04L 1/08* (2013.01); *H04W 48/12* (2013.01); *H04W 48/16* (2013.01);
(Continued)

(58) Field of Classification Search
CPC combination set(s) only.
See application file for complete search history.

(56) References Cited

U.S. PATENT DOCUMENTS

| 2014/0098761 | A1 | 4/2014 | Lee et al. |
| 2015/0016312 | A1* | 1/2015 | Li ........................... H04L 5/14 370/280 |

(Continued)

FOREIGN PATENT DOCUMENTS

| WO | 2011/000441 A1 | 1/2011 |
| WO | 2011/025788 A1 | 3/2011 |

(Continued)

*Primary Examiner* — Lakeram Jangbahadur
(74) *Attorney, Agent, or Firm* — Birch, Stewart, Kolasch & Birch, LLP

(57) ABSTRACT

A method performed by a wireless device in a wireless communication system includes receiving multiple thresholds from a base station (BS); measuring a quality of a cell; determining a coverage enhancement (CE) level of the wireless device based on the multiple thresholds and the measured quality of the cell; receiving random access channel (RACH) information including at least one window size value and at least one timer value for contention resolution, from the BS; selecting a window size value and a timer value among the RACH information based on the determined CE level; transmitting a first message for the RACH to the BS; receiving a second message for the RACH based on the selected window size value, from the BS; and starting a timer for contention resolution based on the selected timer value regarding a third message for the RACH. Further, the CE level is determined as a CE level 0, when the measured quality is above or equal to all of the multiple thresholds.

8 Claims, 15 Drawing Sheets

Related U.S. Application Data

(60) Provisional application No. 62/144,338, filed on Apr. 8, 2015, provisional application No. 62/143,819, filed on Apr. 7, 2015.

(51) Int. Cl.
    *H04L 1/08* (2006.01)
    *H04W 48/12* (2009.01)
    *H04W 48/20* (2009.01)
    *H04L 1/00* (2006.01)
    *H04W 4/70* (2018.01)
    *H04W 60/04* (2009.01)
    *H04W 72/04* (2009.01)
    *H04W 74/08* (2009.01)
    *H04W 88/04* (2009.01)

(52) U.S. Cl.
    CPC ....... *H04L 2001/0093* (2013.01); *H04W 4/70* (2018.02); *H04W 48/20* (2013.01); *H04W 60/04* (2013.01); *H04W 72/048* (2013.01); *H04W 74/0833* (2013.01); *H04W 88/04* (2013.01)

(56) References Cited

U.S. PATENT DOCUMENTS

| | | |
|---|---|---|
| 2015/0043445 A1 | 2/2015 | Xiong et al. |
| 2016/0205659 A1* | 7/2016 | Bergman .............. H04L 1/1812 370/252 |
| 2017/0006572 A1 | 1/2017 | Lee et al. |
| 2018/0070403 A1* | 3/2018 | Uemura ................. H04W 4/70 |

FOREIGN PATENT DOCUMENTS

| | | |
|---|---|---|
| WO | 2014/055878 A1 | 4/2014 |
| WO | 2015/005701 A1 | 1/2015 |
| WO | 2015/026285 A2 | 2/2015 |

* cited by examiner

US 11,051,178 B2

METHOD AND DEVICE FOR APPLYING VALUE ON BASIS OF COVERAGE EXTENSION LEVEL

CROSS-REFERENCE TO RELATED APPLICATIONS

This Application is a Continuation of co-pending U.S. patent application Ser. No. 15/562,700 filed on Sep. 28, 2017, which is the National Phase of PCT International Application No. PCT/KR2016/003570 filed on Apr. 6, 2016, which claims the priority benefit under 35 U.S.C. § 119(e) to U.S. Provisional Application Nos. 62/144,338 filed on Apr. 8, 2015 and 62/143,819 filed on Apr. 7, 2015, all of which are hereby expressly incorporated by reference into the present application.

BACKGROUND OF THE INVENTION

Field of the Invention

The present invention relates to a wireless communication system, and more particularly, to a method of applying a value corresponding to a coverage extension level on the basis of the coverage extension level, and an apparatus supporting the method.

Discussion of the Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

In recent years, machine-to-machine/Internet of Things (M2M/IoT), which connects all every objects through networks to facilitate obtaining and transmitting necessary information anytime and anywhere, thereby making it possible to offer and use various services, has become a major issue for a next-generation communication market.

While early M2M started with a sensor and an RFID network mainly for local areas, various wired/wireless networks may be used with gradually diversifying purposes and characteristics of applications. Recently, M2M based on a mobile communication network receives growing attention in view of the mobility of objects, a wide range of service areas including not only islands and mountains but also the sea, ease of network management and maintenance, security for reliable data transmission, and guarantee of service quality. Accordingly, with studies on the feasibility of M2M started in 2005, the 3GPP has been conducting a full-scale standardization project under the name "Machine Type Communications (MTC)" since 2008.

The 3GPP regards a machine as an entity that does not require direct human manipulation or intervention and defines MTC as a form of data communication involving one or more of machines. Typical examples of the machine include a smart meter and a vending machine that are equipped with a mobile communication module. Recently, with the introduction of a smart phone that performs communication by automatically connecting to a network, without any user operation or intervention, depending on a user's location or conditions, a mobile terminal having an MTC function is considered as a form of a machine. Also, a gateway-type MTC device connected to an IEEE 802.15 WPAN-based subminiature sensor or RFID is also considered.

SUMMARY OF THE INVENTION

In case of a UE operating in a coverage extension mode, the higher the coverage extension level, the greater the number of repetitions required for reception, or the longer the time required for successful transmission/reception. For example, the higher the coverage extension level of the UE, the longer the timer value and the greater the window size. Accordingly, the present invention proposes a method in which the UE applies a value corresponding to the coverage extension level on the basis of the coverage extension level, and an apparatus supporting the method.

According to one embodiment, there is provided a method by which a UE applies a value corresponding to a coverage enhancement (CE) level on the basis of the CE level in a wireless communication system. The method may include: receiving from a network a list including one or more values corresponding to one or more CE levels; determining the CE level; and applying a value corresponding to the determined CE level among the values included in the list.

The list may include a parameter used in a random access procedure. The parameter used in the random access procedure may include at least any one of mac-ContentionResolutionTimer, ra-ResponseWindowSize, and preambleTransMax.

The method may further include performing a cell attach procedure, a cell re-attach procedure, a random access procedure, or data transmission/reception by using a value corresponding to the applied CE level.

The list may include one or more timer values corresponding to the one or more CE levels. The timer value may be at least any one of T300, T303, T305, T306, and a timer value used by the UE to declare a failure in SIB acquisition. The timer value may be mac-ContentionResolutionTimer. The higher the CE level, the longer the timer value.

The list may include one or more window sizes corresponding to the one or more CE levels. The window size may be ra-ResponseWindowSize.

The list may include one or more maximum counter values corresponding to the one or more CE levels. The maximum counter value may be connEstFailCount or preambleTransMax.

The UE may be in an RRC_IDLE state.

According to another embodiment, there is provided a method by which a UE applies a value corresponding to a CE level on the basis of the CE level in a wireless communication system. The method may include: receiving from a network a specific value and one or more offset values corresponding to one or more CE levels; determining the CE level; manipulating the specific value by using an offset value corresponding to the determined CE level; and applying the manipulated specific value.

According to another embodiment, there is provided a UE which applies a value corresponding to a CE level on the basis of the CE level in a wireless communication system. The UE may include: a memory; a transceiver; and a processor operatively coupled to the memory and the transceiver. The processor may be configured for: controlling the transceiver to receive from a network a list including one or more values corresponding to one or more CE levels;

determining the CE level; and applying a value corresponding to the determined CE level among the values included in the list.

Smooth communication of a UE operating in a coverage extension mode can be supported by varying a value applied depending on the coverage extension level of the UE.

DETAILED DESCRIPTION OF THE EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
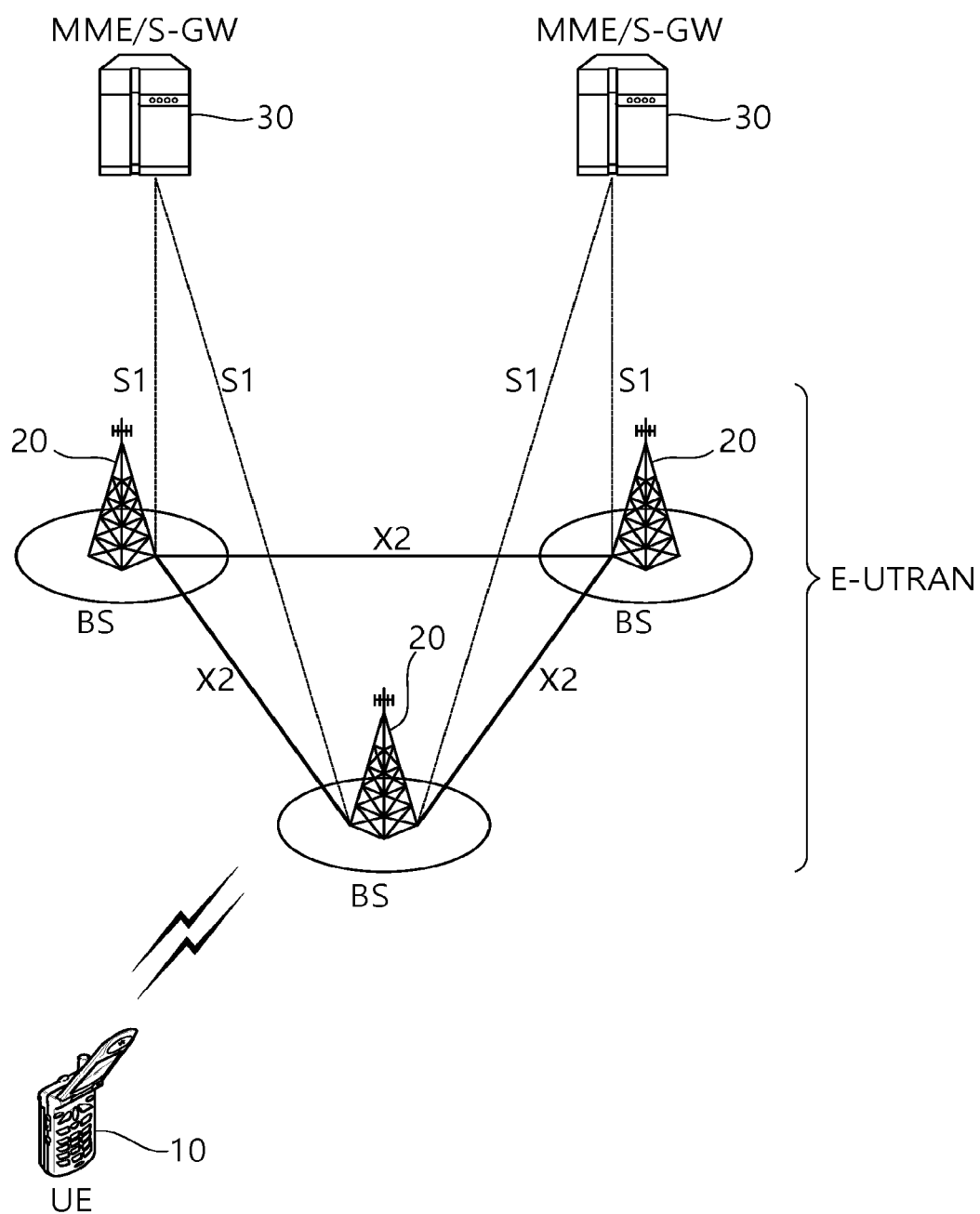
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
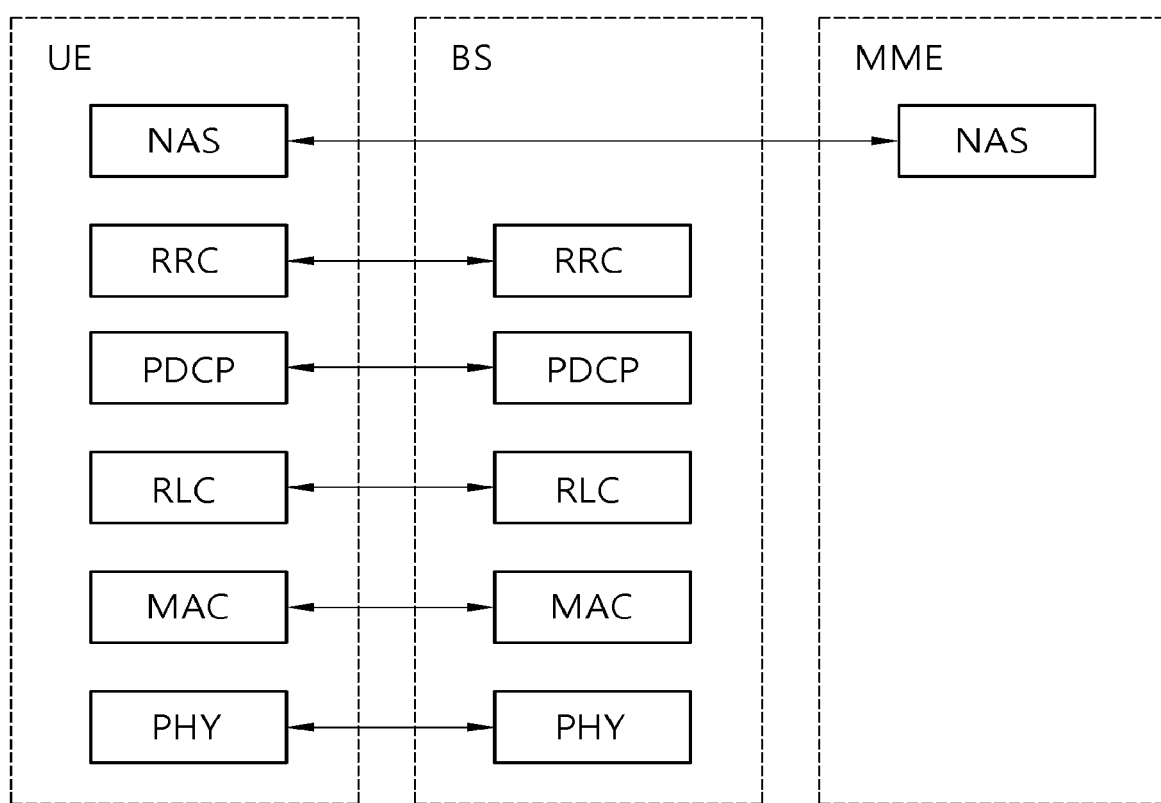
FIG. 2 shows a control plane of a radio interface protocol of an LTE system.
Figure 3:
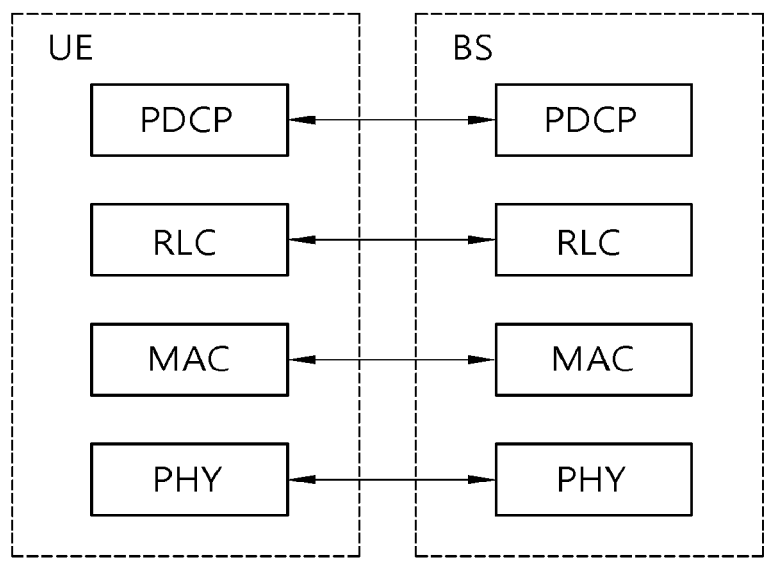
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE.

The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of manipulating a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
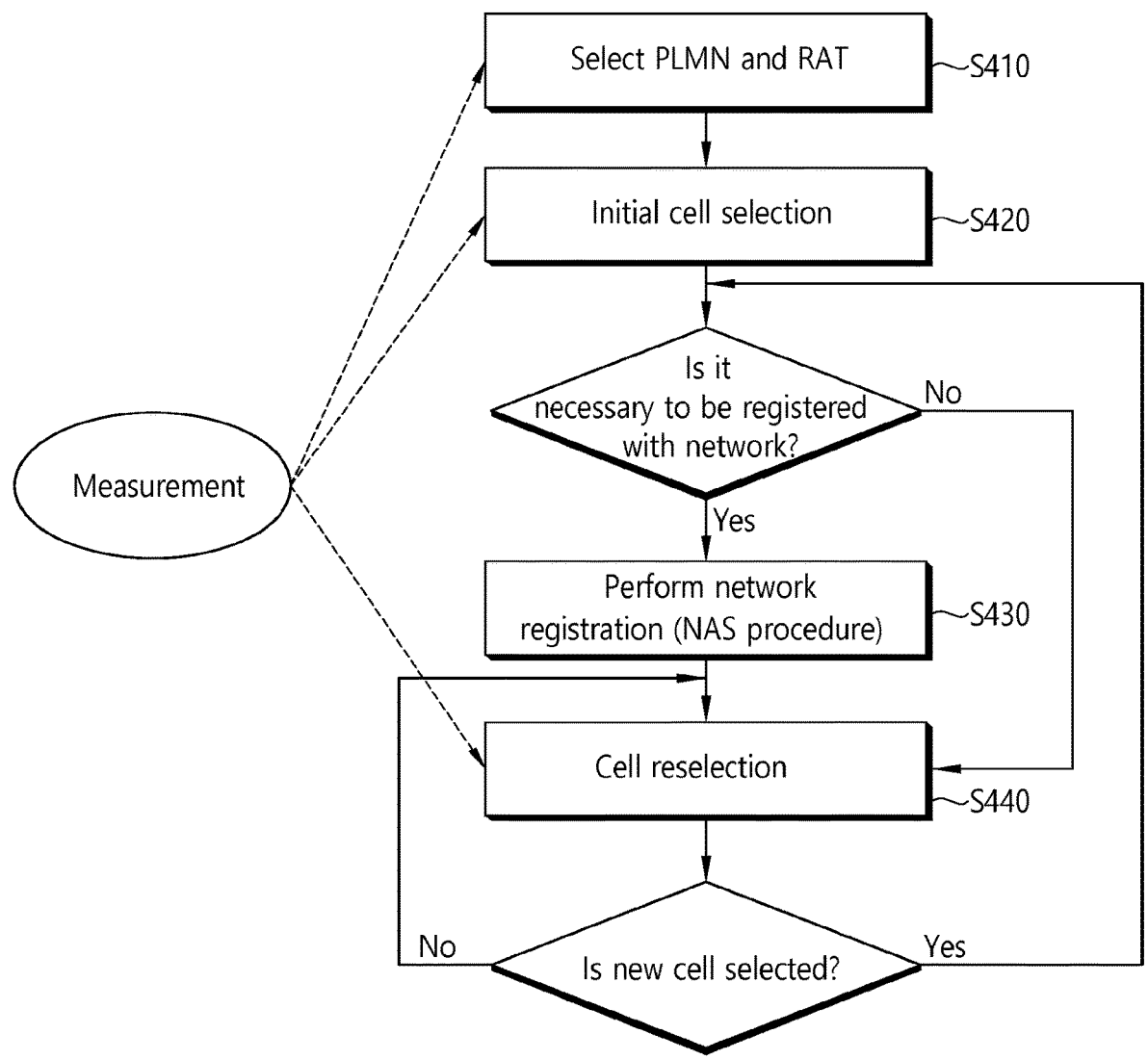
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAD) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
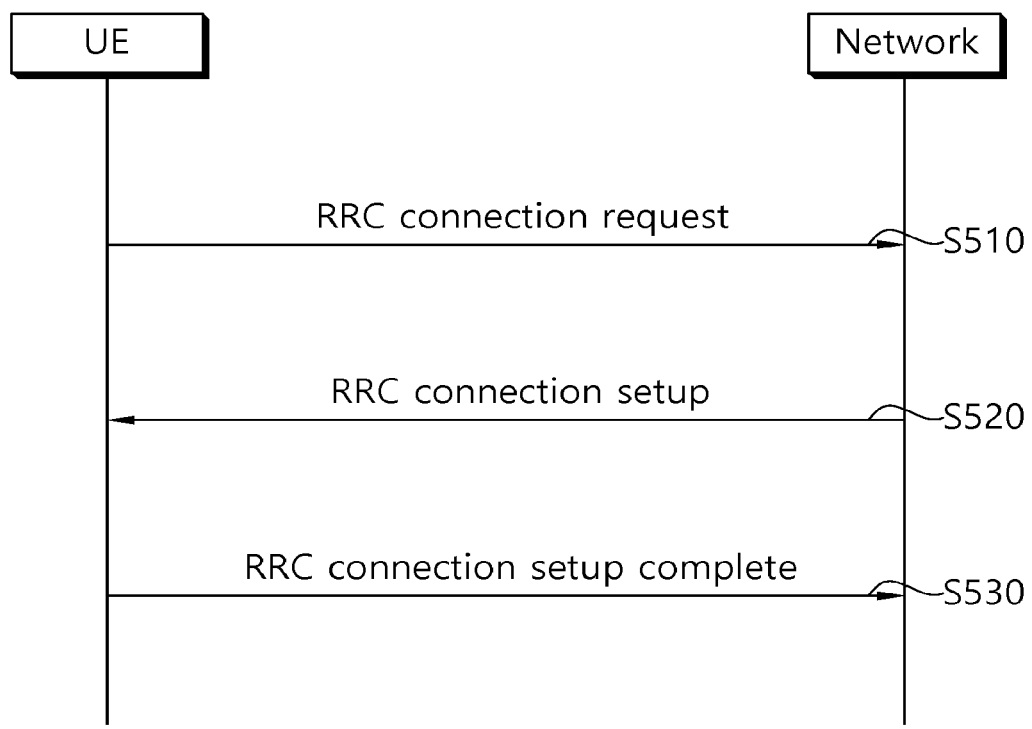
FIG. 5 shows an RRC connection establishment procedure.

FIG. 5 shows an RRC connection establishment procedure.

The UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
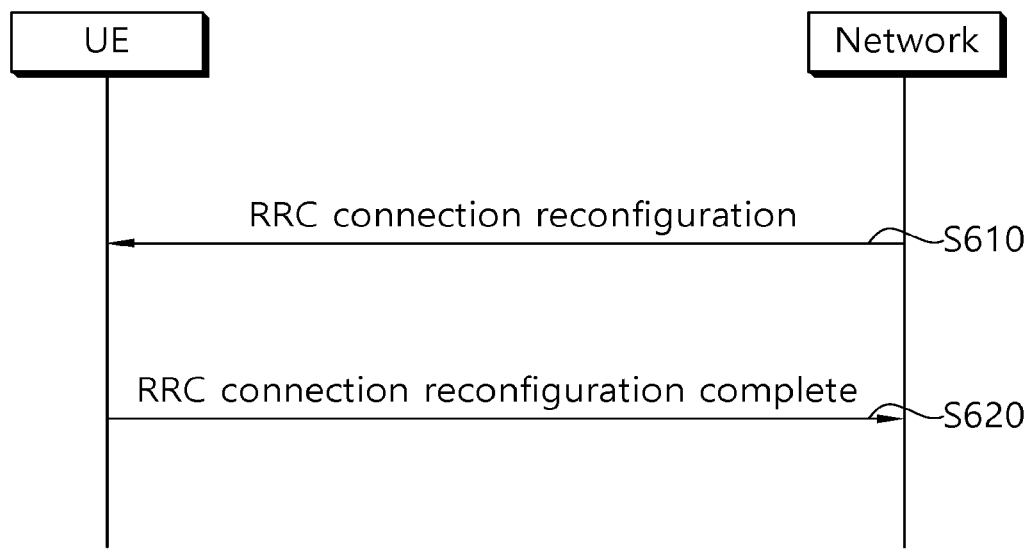
FIG. 6 shows an RRC connection reconfiguration procedure.

FIG. 6 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

The following is a detailed description of a procedure of selecting a cell by a UE.

When power is turned-on or the UE is located in a cell, the UE performs procedures for receiving a service by selecting/reselecting a suitable quality cell.

A UE in an RRC idle state should prepare to receive a service through the cell by always selecting a suitable quality cell. For example, a UE where power is turned-on just before should select the suitable quality cell to be registered in a network. If the UE in an RRC connection state enters in an RRC idle state, the UE should selects a cell for stay in the RRC idle state. In this way, a procedure of selecting a cell satisfying a certain condition by the UE in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the UE.

Hereinafter, a method and a procedure of selecting a cell by a UE in a 3GPP LTE is described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on.

Inter-RAT cell reselection: UE reselects a cell that uses RAT different from RAT on which the UE camps.

The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each UE set by a network may refer to a dedicated priority. If receiving the dedicated priority, the UE may receive a valid time associated with the dedicated priority together. If receiving the dedicated priority, the UE starts a validity timer set as the received valid time together therewith. While the valid timer is operated, the UE applies the dedicated priority in the RRC idle mode. If the valid timer is expired, the UE discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, R_n = Q_{meas,n} - Q_{offset}$$ [Equation 1]

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Figure 7:
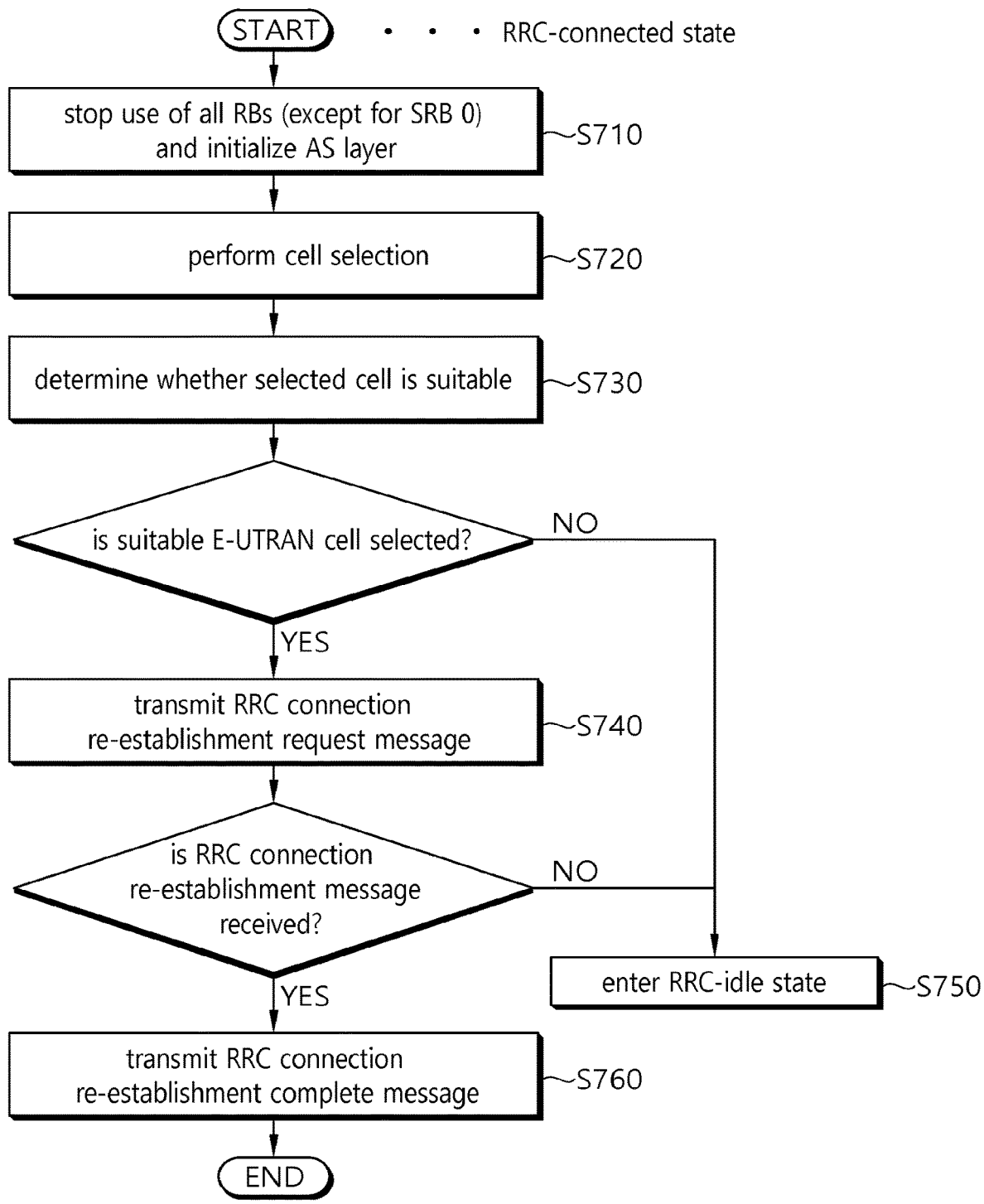
FIG. 7 shows an RRC connection re-establishment procedure.

FIG. 7 shows an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Hereinafter, machine type communication (MTC) will be described.

Figure 8:
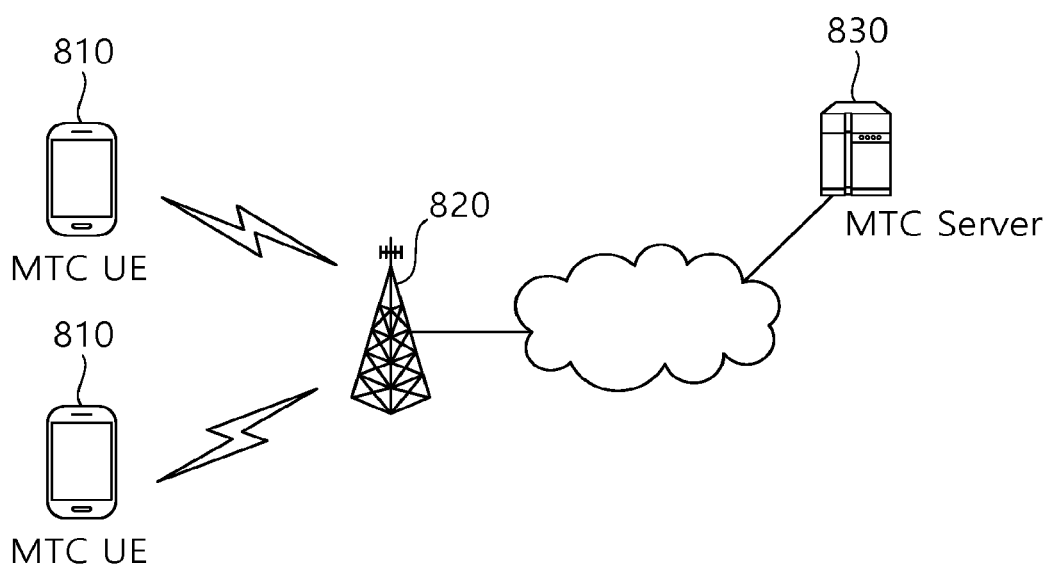
FIG. 8 shows an example of MTC.

FIG. 8 shows an example of MTC.

MTC refers to information exchange between MTC UEs 810 via a BS 820 without involving human interactions or information exchanges between an MTC UE 810 and an MTC server 830 via the BS. Services provided through MTC are differentiated from existing communication services requiring human intervention, and MTC provides a wide range of services, such as tracking, metering, payment, medical services, remote control, and the like. More specifically, services provided through MTC may include reading a meter, measuring a water level, utilizing a surveillance camera, reporting the inventory of a vending machine, and the like. Data communication-oriented low-cost/low-specification UEs that provide these services are referred to as an MTC UE or low complexity-type UE for convenience. A BS may determine whether a UE is an MTC UE based on the capability of the UE. In the present specification, an MTC UE, a low-complexity UE, a low-cost UE, and a UE Category 0 UE may be used with the same meaning, and a normal UE may be used to refer to a UE other than the listed UEs.

The MTC server 830 is an entity communicating with the MTC UE 810. The MTC server 830 runs an MTC application and provides an MTC-specific service to an MTC device. The MTC UE 810 is a wireless device that provides MTC communication and may be fixed or mobile.

Since an MTC UE has a small amount of data to transmit and is occasionally involved in uplink/downlink data transmission/reception, it is effective to reduce the cost of the UE and to decrease battery consumption thereof according to a low data transmission rate. The MTC UE is characterized by low mobility and thus has a hardly changing channel environment.

The MTC UE does not require a high-performance function and generally uses a small amount of data. The concept of UE Category 0 is introduced in order to manufacture a low-cost MTC UE. A UE category is a general number used in the 3GPP to indicate how much data a UE can process in a communication modem. Table 1 shows 3GPP UE categories.

TABLE 1

| UE Category | DL speed | UL speed |
|---|---|---|
| 0 | 1 Mbps | 1 Mbps |
| 1 | 10 Mbps | 5 Mbps |
| 2 | 50 Mbps | 25 Mbps |
| 3 | 100 Mbps | 50 Mbps |
| 4 | 150 Mbps | 50 Mbps |
| 5 | 300 Mbps | 75 Mbps |
| 6 | 300 Mbps | 50 Mbps |
| 7 | 300 Mbps | 100 Mbps |
| 8 | 3 Gbps | 1.5 Gbps |
| 9 | 450 Mbps | 50 Mbps |
| 10 | 450 Mbps | 100 Mbps |
| 11 | 600 Mbps | 50 Mbps |
| 12 | 600 Mbps | 100 Mbps |
| 13 | 400 Mbps | 50 Mbps |

A UE Category 0 UE is allowed to process only 1 Mbps, making it possible to manufacture a modem without much effort and high costs, and may use only one antenna. Also, the UE Category 0 UE is allowed to perform transmission or reception only in a specified time, rather than simultaneously performing transmission and reception, and thus may operate in FDD in the same manner as in TDD. In addition, unlike in existing TDD, a sufficient switching time of about 1 ms may be assigned for a period of transition between transmission and reception, thereby remarkably reducing costs for hardware components, particularly in view of a modem and RF, overall.

MTC UEs may be installed not only in buildings and factories but also in coverage-limited places, for example, a basement. For instance, about 20% of MTC UEs supporting an MTC service, such as smart metering, may be installed in a poor 'deep indoor' environment, such as a basement. Thus, for successful MTC data transmission, it is necessary to increase the coverage of an MTC UE by about 20 dB as compared with the coverage of a conventional normal UE. Considering this situation, various coverage enhancement techniques are currently under discussion, such as a repetitive transmission method for an MTC UE by each channel/signal.

Figure 9:
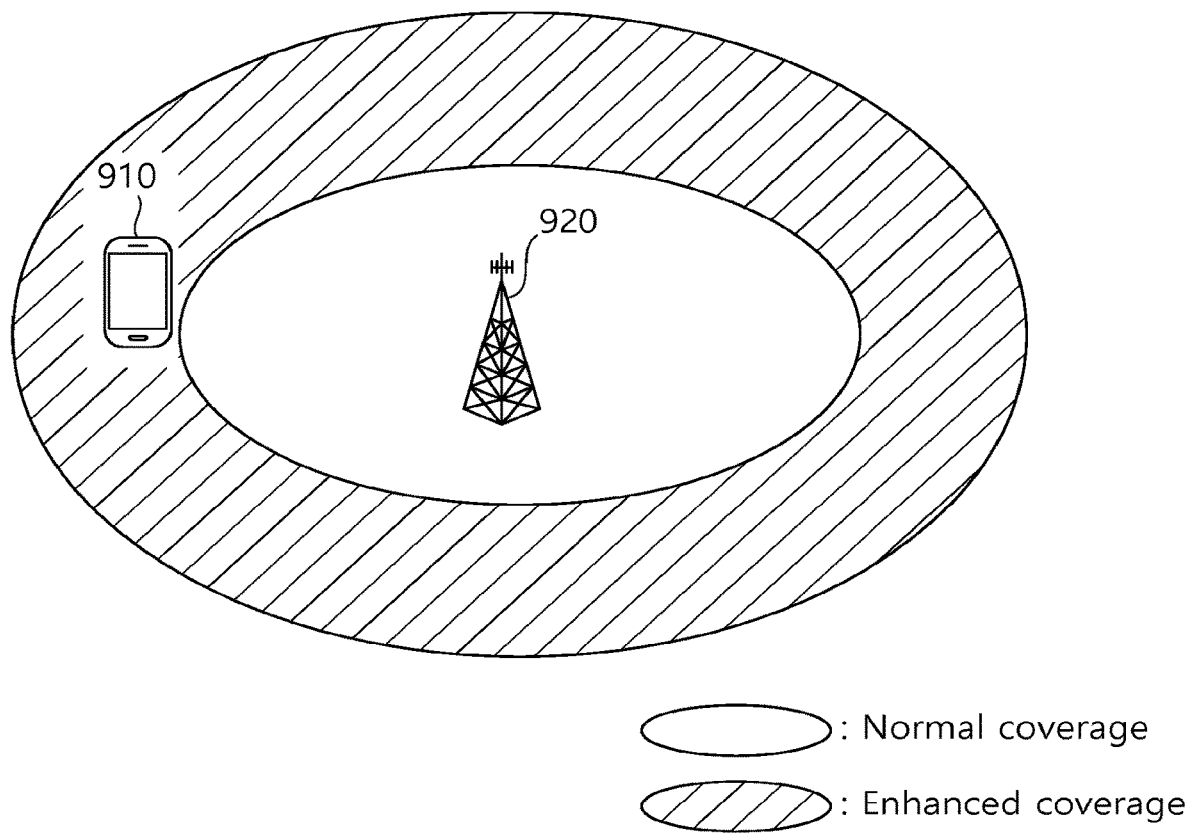
FIG. 9 shows an example of cell coverage enhancement for an MTC device.

FIG. 9 shows an example of cell coverage enhancement for an MTC device.

As described above, various coverage enhancement techniques, such as a repetitive transmission method for an MTC UE by each channel/signal, have recently been under discussion.

According to a location of a UE in a cell and signal quality of the UE in the cell, the coverage extension technique may be required not only for an MTC UE but also for a normal UE. In general, a repetitive transmission method may be used as the coverage extension technique. The number of repetitions required for successful transmission/reception may differ depending on a scenario and UE capability. For example, in the extended coverage (SNR=−14.3 dB), the number of repetitions performed on 328-bit SIB by an MTC UE of Rel-13 may be about 150. In addition, it is expected that the similar number of repetitions is also required in case of paging.

A time required for successful transmission/reception may differ depending on the required number of repetitions. This may have an effect on all timer values of the standard document. In other words, a time duration needs to be increased when a greater number of repetitions are required.

On the contrary, a short time duration may be sufficient when a small number of repetitions are required. For example, if the UE attempts to establish an RRC connection, since a time for transmitting/receiving signals/data differs depending on the coverage extension level (hereinafter, referred to as a 'CE level'), the required time may differ depending on the CE level.

In order to solve the aforementioned problem, the present invention proposes a method in which a UE applies a value corresponding to a CE level on the basis of the CE level, and an apparatus supporting the method. For example, the value corresponding to the CE level may be a timer value, a window size, a maximum counter value, or the like. According to an embodiment of the present invention, the UE may include three steps, i.e., a step of receiving a list including one or more values (e.g., a timer value, a window size, a maximum counter value, or an offset value) corresponding to one or more CE levels (first step), a step of determining the CE level (second step), and a step of applying a value (e.g., a timer value, a window size, or a maximum counter value) corresponding to the determined CE level among the values included in the list (third step). Hereinafter, each step will be described in detail.

1. First Step (1) The UE may receive a list including one or more values corresponding to one or more CE levels through broadcast signaling. Additionally, the UE may receive the list including the one or more values corresponding to the one or more CE levels through dedicated signaling. The one or more values may be one or more timer values, one or more window sizes, or one or more maximum counter values. The UE may be in an RRC_IDLE state.

The one or more values may be provided by each CE level. For example, if it is assumed that the CE level is defined from 0 to 3, the UE may receive from a network a 0th timer value corresponding to a CE level 0, a $1^{st}$ timer value corresponding to a CE level 1, a $2^{nd}$ timer value corresponding to a CE level 2, and a $3^{rd}$ timer value corresponding to a CE level 3. In addition, the UE may receive from the network a $0^{th}$ window size corresponding to the CE level 0, a $1^{st}$ window size corresponding to the CE level 1, a $2^{nd}$ window size corresponding to the CE level 2, and a 3rd window size corresponding to the CE level 3. In addition, the UE may receive from the network a 0th maximum counter value corresponding to the CE level 0, a $1^{st}$ maximum counter value corresponding to the CE level 1, a $2^{nd}$ maximum counter value corresponding to the CE level 2, and a $3^{rd}$ maximum counter value corresponding to the CE level 3. Although it is assumed in the embodiment of the present invention that the CE level can be set from 0 to 3, this merely means that one or more levels can be set, and the technical scope of the present invention is not limited thereto. A method of determining the CE level by the UE is described in detail in the second step. The higher the CE level, the longer the timer value, the greater the window size, and the greater the maximum counter value.

The one or more values (e.g., the timer value, the window size, or the maximum counter value) may be an RRC layer timer value, an RRC layer window size, or an RRC layer maximum counter value. For example, the value may be T300, T303, T305, T306, connEstFailCount, or a timer value used by the UE to declare a failure in SIB acquisition. For example, in the RRC connection establishment procedure, the higher the CE level of the UE, the longer the expiration time of T300.

The one or move values (e.g., the timer value, the window size, or the counter value) may be a MAC layer timer value, a MAC layer window size, or a MAC layer maximum counter value. For example, it may be preambleTransMax, mac-ContentionResolutionTimer, or ra-ResponseWindowSize. For example, in the random access procedure, the higher the CE level of the UE, the greater the maximum number of preambles to be transmitted (preambleTransMax). For example, in the random access procedure, the higher the CE level of the UE, the greater the random access response window size (ra-ResponseWindowSize). For example, in the random access procedure, the higher the CE level of the UE, the longer the expiration time of the contention resolution timer (mac-ContentionResolutionTimer).

(2) Alternatively, the UE may receive a different offset value related to the CE level through broadcast signaling. The UE may also receive the different offset value related to the CE level through dedicated signaling. The offset value may differ for each of the timer value, the window size, and the maximum counter value.

The UE may manipulate a specific value by using the received offset value. The specific value may be any one of the timer value, the window size, and the maximum counter value. The manipulation may be performed by multiplication, addition, subtraction, and/or division. The manipulated value may be different from each other depending on the CE level of the UE. For example, the UE may increase a timer value in such a manner that the higher the CE level, the greater the offset to be added or multiplied. The UE may also increase the existing timer value in such a manner that the higher the CE level, the smaller the offset to be subtracted or divided.

(3) A broadcast message (e.g., SIB) may be classified into two types of SIB.

A first type of the broadcast message is a common broadcast message for all UEs which use a different CE level. A second type is a separate broadcast message for each CE UE. The UE may be required to receive the common broadcast message and a broadcast message related to the CE level of the UE. The common broadcast message may be transmitted with a maximum CE level (the maximum number of repetitions/resources).

A different broadcast message (e.g., SIB) may be defined for each CE level to provide information related to each CE level. The different broadcast message may be transmitted with different time/frequency resources. In addition, each broadcast message corresponding to each CE level may be transmitted with a repetition/resource amount corresponding to the CE level.

The different broadcast message (e.g., SIB) may be used to provide the timer value, the window size, or the maximum counter value for each CE level. For example, SIB20a may be used for a timer value, window size, or maximum counter value of a CE level 0, SIB20b may be used for a timer value, window size, or maximum counter value of a CE level 1, and SIB20c may be used for a timer value, window size, or maximum counter value for a CE level 2.

2. Second Step

The UE may determine a CE level. The UE may determine the CE level of the UE for transmission/reception in a specific cell in the following manner. Each threshold may be provided by a serving cell.

(1) RSRP/RSRQ-based CE level determination: The UE may determine a CE level of a cell by comparing a measured RSRP/RSRQ result and a pre-set threshold.

In order for the UE to determine the CE level in a specific cell, a network may set an RSRP/RSRQ threshold for one or more CE levels. For example, the network may signal a 0th RSRP/RSRQ threshold for a CE level 0, a $1^{st}$ RSRP/RSRQ threshold for a CE level 1, a $2^{nd}$ RSRP/RSRQ threshold for a CE level 2, and a $3^{rd}$ RSRP/RSRQ threshold for a CE level 3. The level 0 implies that there is no coverage extension for measurement.

While performing measurement of a serving cell and a neighboring cell, the UE may determine the CE level by comparing a threshold which is set by the network and an RSRP/RSRQ result which is measured by the UE. If the measurement result is higher than the 0th RSRP/RSRQ threshold, the UE may determine the CE level as 0. If the measurement result is lower than the 0th RSRP/RSRQ threshold and higher than the Pt RSRP/RSRQ threshold, the UE may determine the CE level as 1. If the measurement result is lower than the Pt RSRP/RSRQ threshold and higher than the $2^{nd}$ RSRP/RSRQ threshold, the UE may determine the CE level as 2. Likewise, if the measurement result is lower than the $2^{nd}$ RSRP/RSRQ threshold and higher than the $3^{rd}$ RSRP/RSRQ threshold, the UE may determine the CE level as 3.

(2) PSS (Primary Synchronization Signal)/SSS(Secondary Synchronization Signal)-based CE level determination: The UE may determine a CE level of a cell by comparing a time for acquiring PSS/SS and a pre-set threshold.

In order for the UE to determine the CE level in a specific cell, a network may set an RSRP/RSRQ threshold for one or more CE levels. For example, the network may signal a 0th time threshold for a CE level 0, a Pt time threshold for a CE level 1, a $2^{nd}$ time threshold for a CE level 2, and a $3^{rd}$ time threshold for a CE level 3. The level 0 implies that there is no coverage extension for measurement.

While performing measurement of a serving cell and a neighboring cell, the UE may determine a CE level by comparing a time threshold which is set by the network and a time for acquiring PSS/SSS. If the time for acquiring the PSS/SSS is shorter than the $0^{th}$ time threshold, the UE may determine the CE level as 0. If the time for acquiring the PSS/SSS is longer than the $0^{th}$ time threshold and shorter than the $1^{st}$ time threshold, the UE may determine the CE level as 1. If the time for acquiring the PSS/SSS is longer than the Pt time threshold and shorter than the $2^{nd}$ time threshold, the UE may determine the CE level as 2. If the time for acquiring the PSS/SSS is longer than the $2^{nd}$ time threshold and shorter than the $3^{rd}$ time threshold, the UE may determine the CE level as 3.

(3) Downlink message-based CE level determination: The UE may determine a CE level of a cell by comparing the number of repetitions required to successfully receive a certain downlink message and a pre-set threshold.

(4) Uplink message-based CE level determination: The UE may determine a CE level of a cell by comparing the number of repetitions required to successfully transmit a certain uplink message and a pre-set threshold.

Although it is assumed in the embodiment of the present invention that the CE level can be set from 0 to 3, this merely means that one or more levels can be set, and the technical scope of the present invention is not limited thereto.

3. Third Step (1) The UE may apply a value corresponding to the CE level determined in the second step among values included in the list received in the first step. The value corresponding to the determined CE level may be a timer value corresponding to the determined CE level, a window size corresponding to the determined CE level, or a maximum counter value corresponding to the determined CE level. That is, the value corresponding to the determined CE level may be determined when a MAC layer, RLC layer, or RRC layer operation starts/restarts. For example, the timer value, window size, or maximum counter value corresponding to the determined CE level may be determined when the UE transmits an RRC connection request, when an access is prohibited during an RRC connection establishment is performed for mobile originating call/signaling/CS fallback, when mac-ContentionResolutionTimer starts, when mac-ContentionResolutionTimer restarts, or when a preamble transmission counter is set to 1.

While operating (e.g., a timer is running, a counter value is not an initial value (i.e., the value is increased/decreased), a time is in the middle of a window), even if the CE level is changed, a value corresponding to the CE level determined when the MAC layer, RLC layer, or RRC layer operation starts may not be changed.

When a timer stops and/or expires, the value corresponding to the determined CE level may be re-evaluated on the basis of a current CE level of the UE. For example, when the counter stops, the timer value, the window size, or the maximum counter value may be re-evaluated on the basis of the current CE level of the UE.

A timer and/or a counter may start when initial transmission/reception starts during repetition. Alternatively, the timer and/or the counter may start when transmission/reception ends during repetition.

The method described through the first step to the third step may also be applied to a UE in an RRC_CONNECTED state. A method improved from the method applied in a UE in the RRC_IDLE state may be applied to the UE in the RRC_CONNECTED state. If the CE level is changed while the UE is in the RRC_CONNECTED state, the UE may notify the network that the CE level is changed. The notification may be transmitted to the network after the UE changes the CE level. The CE level may be determined in the aforementioned second step. The notification may include at least any one of the changed CE level, a difference between a previous CE level and the changed CE level, and the number of repetitions (resources) further required to transmit uplink data/signal or downlink data/signal in comparison with the previous CE level. Upon receiving the notification, the network may reconfigure the timer value, the window size, the maximum counter value, or the like.

Figure 10:
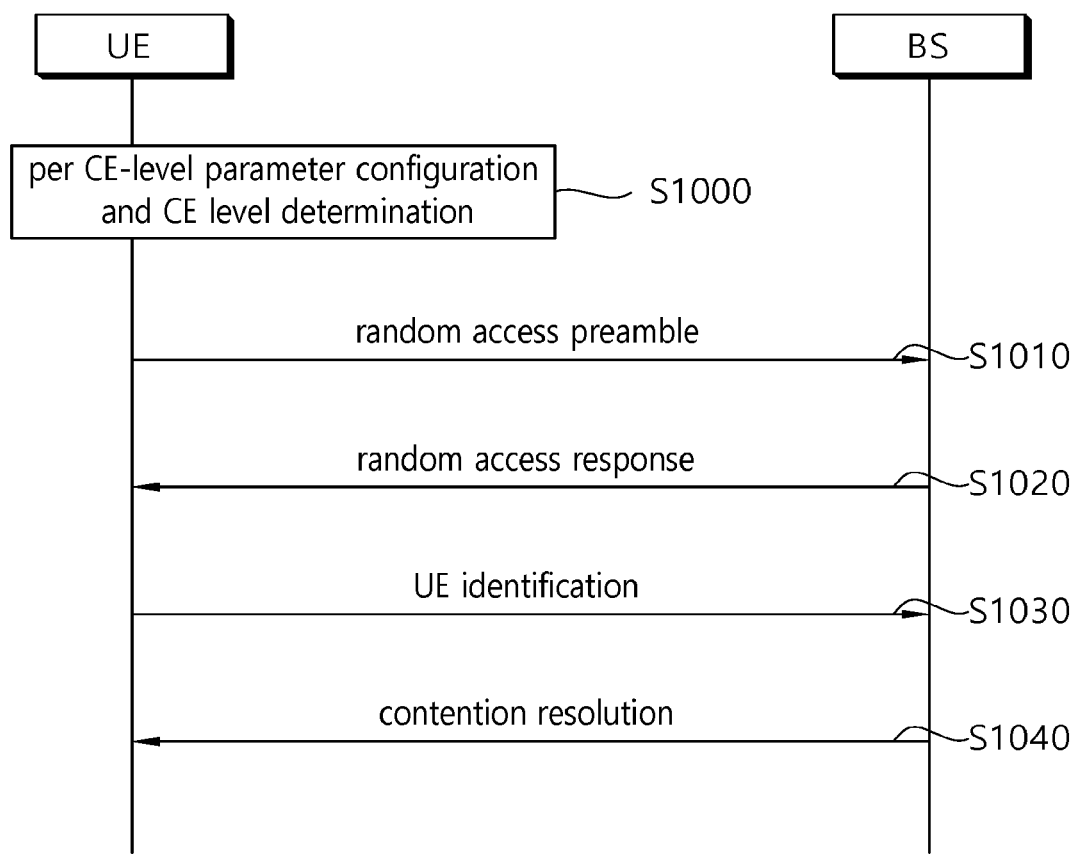
FIG. 10 shows a method of considering a CE level of a UE in a contention-based random access procedure according to an embodiment of the present invention.

FIG. 10 shows a method of considering a CE level of a UE in a contention-based random access procedure according to an embodiment of the present invention.

(1) Per-CE Level Parameter Configuration and CE Level Determination (S1000)

Before starting the random access procedure, it is assumed that the following information can be used for a CE UE.

prach-ConfigIndex: a set of available PRACH resources related to each CE level supported in a serving cell for transmission of a random access preamble.

preambleMappingInfoList: a set of random access preambles available in each group, and a group of random access preambles. A preamble included in the random access preamble for each CE level is calculated, if exists, from parameters firstPreamble and lastPreamble.

RSRP-ThresholdsPrachInfoList: a PRACH resource selection criterion based on RSRP measurement for each CE level supported in a serving cell.

maxNumPreambleAttemptCE: the maximum number of preambles to be transmitted for each CE level supported in a serving cell.

numRepetitionPerPreambleAttempt: the number of repetitions required for a preamble transmission attempt for each CE level supported in a serving cell.

ra-ResponseWindowSize: a random access response window size for each CE level supported in a serving cell.

mac-ContentionResolutionTimer: a contention resolution timer for each CE level supported in a serving cell.

preambleTransMax-CE: the maximum number of preambles to be transmitted.

In case of the CE UE, the CE level of the UE may be determined before the random access procedure starts. For example, if the measured RSRP is less than an RSRP of the CE level 3, it may be regarded that a MAC entity is at the CE level 3. Otherwise, if the measured RSRP is less than an RSRP of the CE level 2, it may be regarded that the MAC entity is at the CE level 2. Otherwise, if the measured RSRP is less than an RSRP of the CE level 1, it may be regarded that the MAC entity is at the CE level 1. Otherwise, it may be regarded that the MAC entity is at the CE level 0. The RSRP of the CE level 3, the RSRP of the CE level 2, and the RSRP of the CE level 1 may be included in RSRP-ThresholdsPrachInfoList.

(2) First Message Transmission (S1010)

The UE may randomly select one random access preamble from a set of random access preambles indicated through system information or handover commands, and may select a physical RACH (PRACH) resource capable of transmitting the random access preamble. The UE may transmit the selected preamble by using the selected PRACH resource.

The maximum number of preambles to be transmitted (preambleTransMax) may indicate the maximum number of preambles which can be transmitted until the UE starts a specific operation while performing the random access operation. The maximum number of preambles to be transmitted for each CE level (maxNumPreambleAttemptCE) may indicate, for each CE level, the maximum number of preambles which can be transmitted until the UE starts the specific operation while performing the random access operation.

The specific operation may be RRC connection re-establishment or the like. A BS may set preambleTransMax to a proper value to prevent preamble transmission from being infinitely repeated. Alternatively, the BS may set maxNumPreambleAttemptCE to a proper value to prevent preamble transmission from being infinitely repeated.

The UE may receive from the network a list including one or more values 'preambleTransMax' corresponding to one or more CE levels. For example, if it is assumed that the CE level is set to 0 to 3, the UE may receive, from the network, preambleTransMax corresponding to the CE level 0, preambleTransMax corresponding to the CE level 1, preambleTransMax corresponding to the CE level 2, and preambleTransMax corresponding to the CE level 3. The higher the CE level, the greater the preambleTransMax. That is, the maximum number of preambles to be transmitted may be increased in proportion to an increase in the CE level.

Alternatively, the UE may receive from the network a list including one or more values 'maxNumPreambleAttemptCE' corresponding to one or more CE levels. For example, if it is assumed that the CE level is set to 0 to 3, the UE may receive, from the network, maxNumPreambleAttemptCE corresponding to the CE level 0, maxNumPreambleAttemptCE corresponding to the CE level 1, maxNumPreambleAttemptCE corresponding to the CE level 2, and maxNumPreambleAttemptCE corresponding to the CE level 3. The higher the CE level, the greater the maxNumPreambleAttemptCE.

Alternatively, the UE may receive an offset from the network. The UE may use the offset value to adjust preambleTransMax or maxNumPreambleAttemptCE. The adjustment may be performed by multiplication, addition, subtraction, and/or division. The adjusted value may be different from each other depending on the CE level of the UE.

(3) Second Message Reception (S1020)

The UE may receive random access response information from the BS. That is, after transmitting a random access preamble (S1010), the UE may attempt to receive its random attach response within a random access response window size (ra-ResponseWindowSize) indicated by the BS through system information or handover commands. Thereafter, a PDSCH may be received through corresponding RA-RNTI information. Accordingly, the UE may receive a UL grant, a temporary C-RNTI, a timing advance command (TAC), or the like.

The random access response window size (ra-ResponseWindowSize) is a maximum time duration in which the UE which has transmitted the preamble waits to receive the random access response message. If the UE fails to receive a valid random access response message until the random access response window ends, the UE may perform preamble retransmission. That is, if the UE fails to receive the valid random access response message until the random access response window ends, the UE may perform the step S1010 again.

The UE may receive from the network a list including one or more values 'ra-ResponseWindowSize' corresponding to one or more CE levels. For example, if it is assumed that the CE level is set to 0 to 3, the UE may receive, from the network, ra-ResponseWindowSize corresponding to the CE level 0, ra-ResponseWindowSize corresponding to the CE level 1, ra-ResponseWindowSize corresponding to the CE level 2, and ra-ResponseWindowSize corresponding to the CE level 3. The higher the CE level, the greater the ra-ResponseWindowSize. That is, a maximum time duration in which the UE waits to receive the random access response message may be increased in proportion to an increase in the CE level.

Alternatively, the UE may receive an offset from the network. The UE may use the offset value to adjust ra-ResponseWindowSize. The adjustment may be performed by multiplication, addition, subtraction, and/or division. The adjusted value may be different from each other depending on the CE level of the UE.

(4) Third Message Transmission (S1030)

In a case where the UE receives a random access response which is valid for the UE, each piece of information included in the random access response may be processed. That is, the UE may apply TAC, and may store a temporary C-RNTI. In addition, data (i.e., a third message) may be transmitted to the BS by using a UL grant. The third message must include an identifier of the UE. In the contention-based random access procedure, the BS cannot determine which UEs perform the random access procedure because the UE must be identified for future contention resolution.

Two methods are present as a method of including an identifier of the UE. In a first method, if the UE has a valid cell identifier which has already assigned in a corresponding cell before the random access procedure, the UE transmits its cell identifier through an uplink transmission signal corresponding to the UL grant. On the other hand, if the valid cell identifier is not assigned before the random access procedure, the UE performs transmission by including its unique identifier (e.g., an S-TMSI or a random ID). In general, the unique identifier may be longer than a cell identifier. The UE may start a contention resolution timer (mac-ContentionResolutionTimer) if data corresponding to the UL grant is transmitted.

(5) Fourth Message Reception (S1040)

The UE may transmit data including its identifier through a UL grant included in a random access response, and thereafter may wait for an indication of the BS for contention resolution. That is, PDCCH reception may be attempted to receive a specific message. There are two methods for receiving the PDCCH. If the UE has a valid cell identifier which has already assigned in a corresponding cell before the random access procedure and thus transmits its cell identifier through an uplink transmission signal corresponding to the UL grant, PDCCH reception may be attempted by using its cell identifier. Otherwise, if the UE does not have the valid cell identifier assigned before the random access procedure and thus the UE transmits its unique identifier, PDCCH reception may be attempted by using a temporary C-RNTI included in a random access response.

Thereafter, in the former case, if the PDCCH including its cell identifier is received before the contention resolution timer expires, the UE may determine that the random access procedure is normally performed and thus may end the random access procedure. If the PDCCH including its cell identifier is not received before the contention resolution timer expires, the UE may determine that it fails in the contention, and thus may perform the random attach procedure again or may notify a failure occurrence to an upper layer.

In the latter case, if the PDCCH is received through the temporary C-RNTI before the contention resolution timer expires, data delivered by a PDSCH indicated by the PDDCH is confirmed. If its unique identifier is included in content of the data, the UE may determine that the random access procedure is normally performed and thus may end the random access procedure.

The UE may receive from the network a list including one or more values 'mac-ContentionResolutionTimer' corresponding to one or more CE levels. For example, if it is assumed that the CE level is set to 0 to 3, the UE may receive, from the network, mac-ContentionResolutionTimer corresponding to the CE level 0, mac-ContentionResolutionTimer corresponding to the CE level 1, mac-ContentionResolutionTimer corresponding to the CE level 2, and mac-ContentionResolutionTimer corresponding to the CE level 3. The higher the CE level, the greater the mac-ContentionResolutionTimer. That is, the higher the CE level, the longer the time of the contention resolution timer.

Alternatively, the UE may receive an offset from the network. The UE may use the offset value to adjust mac-ContentionResolutionTimer. The adjustment may be performed by multiplication, addition, subtraction, and/or division. The adjusted value may be different from each other depending on the CE level of the UE.

Although it is assumed in the example of FIG. 10 that the CE level can be set from 0 to 3, this merely means that one or more levels can be set, and the technical scope of the present invention is not limited thereto.

Figure 11:
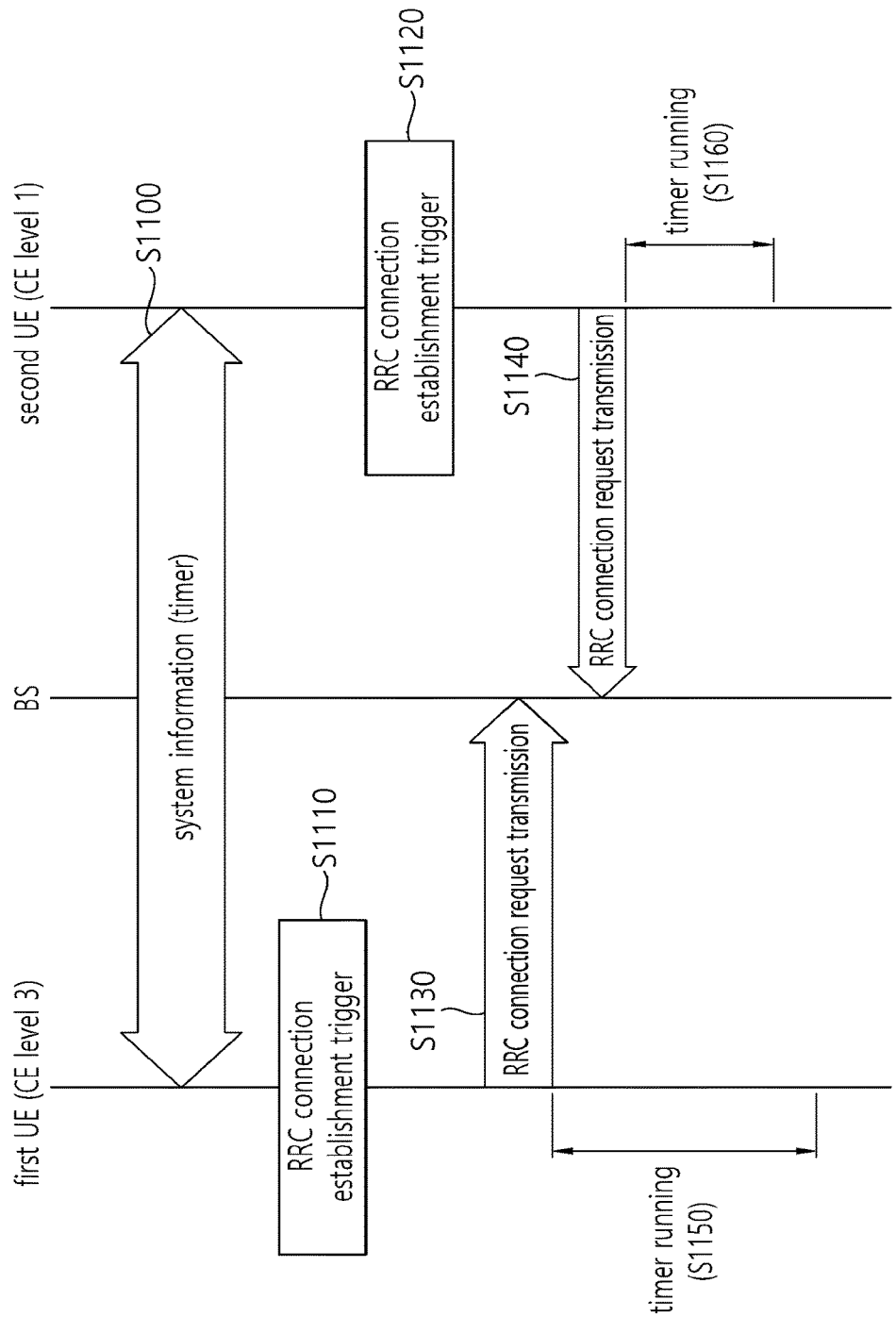
FIG. 11 shows a method of considering a CE level of a UE in an RRC connection establishment procedure according to an embodiment of the present invention.

FIG. 11 shows a method of considering a CE level of a UE in an RRC connection establishment procedure according to an embodiment of the present invention.

Referring to FIG. 11, it is assumed that a width of an arrow corresponds to the number of repetitions for successful transmission/reception, and a high CE level requires the great number of repetitions for successful transmission/reception.

A BS may broadcast a list including one or more timer values (e.g., T300) corresponding to one or more CE levels (S1100). The list may be broadcast through system information. For example, the list may include a timer value corresponding to a CE level 0, a timer value corresponding to a CE level 1, a timer value corresponding to a CE level 2, and a timer value corresponding to a CE level 3.

A first UE may be triggered to establish an RRC connection (S1110).

A second UE may be triggered to establish an RRC connection (S1120).

The first UE of the CE level 3 and the second UE of the CE level 1 may transmit an RRC connection establishment message to a network (S1130, S1140). Since the CE level of the first UE is higher than the CE level of the second UE, the number of repetitions of the RRC connection request message of the first UE may be greater than the number of repetitions of the RRC connection request message of the second UE.

The first UE of the CE level 3 may apply a timer value corresponding to the CE level 3 among timer values included in the list, and a timer to which a corresponding value is applied may run (S1150).

The second UE of the CE level 1 may apply a timer value corresponding to the CE level 1 among the timer values included in the list, and a timer to which a corresponding value is applied may run (S1160).

Since the CE level of the first UE is higher than the CE level of the second UE, a timer running time of the first UE may be longer than a timer running time of the second UE.

Figure 12:
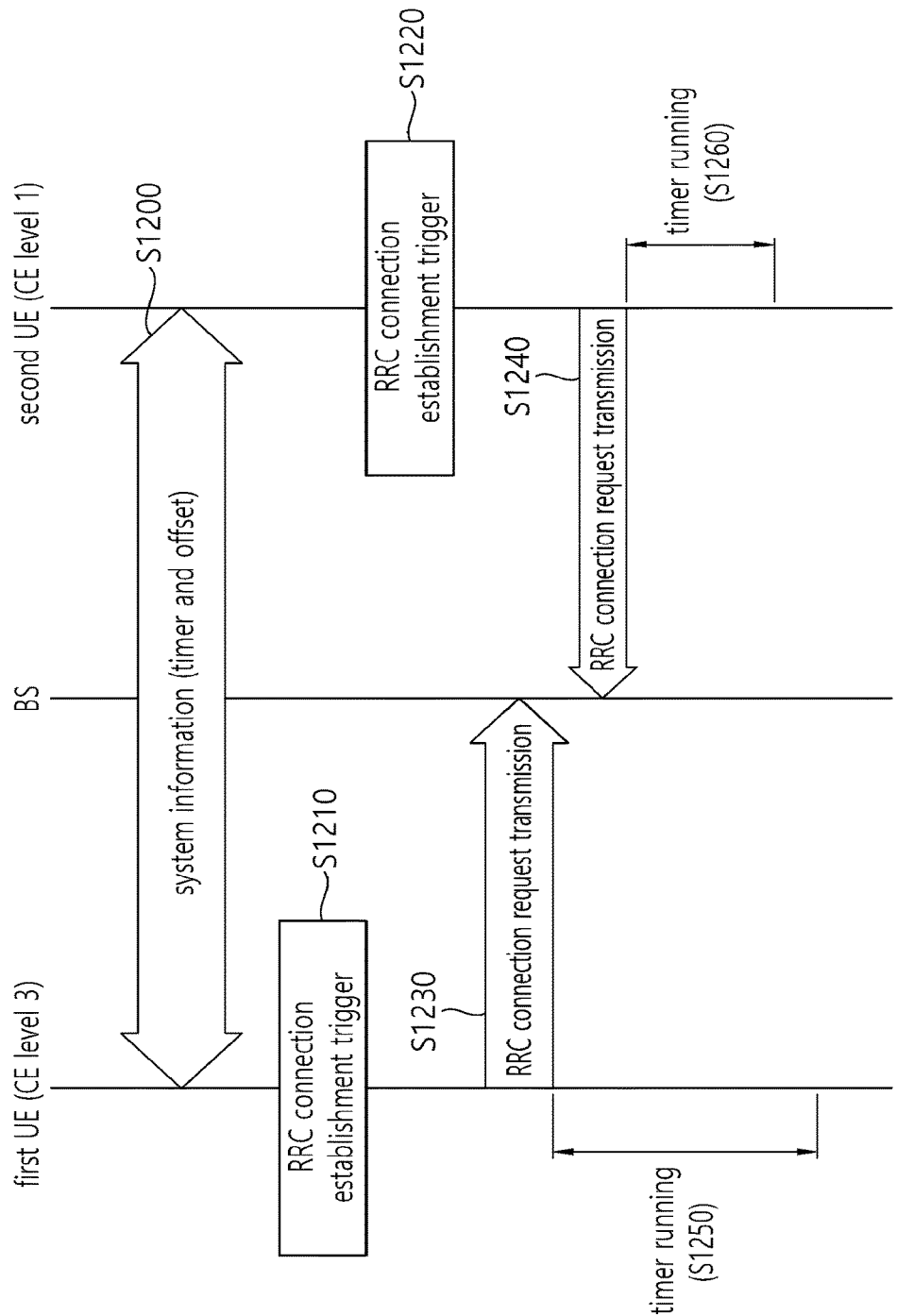
FIG. 12 shows a method of considering a CE level of a UE in an RRC connection establishment procedure according to an embodiment of the present invention.

FIG. 12 shows a method of considering a CE level of a UE in an RRC connection establishment procedure according to an embodiment of the present invention.

Referring to FIG. 12, it is assumed that a width of an arrow corresponds to the number of repetitions for successful transmission/reception, and a high CE level requires the great number of repetitions for successful transmission/reception.

A BS may broadcast a timer value (e.g., T300) and one or more offsets corresponding to one or more CE levels (S1200). For example, the offset may include a 0th offset corresponding to a CE level 0, a first offset corresponding to a CE level 1, a second offset corresponding to a CE level 2, and a third offset corresponding to a CE level 3.

A first UE may be triggered to establish an RRC connection (S1210).

A second UE may be triggered to establish an RRC connection (S1220).

The first UE of the CE level 3 and the second UE of the CE level 1 may transmit an RRC connection establishment message to a network (S1230, S1240). Since the CE level of the first UE is higher than the CE level of the second UE, the number of repetitions of the RRC connection request message of the first UE may be greater than the number of repetitions of the RRC connection request message of the second UE.

The first UE of the CE level 3 may manipulate a timer value by using an offset corresponding to the CE level 3 among the offsets. Thereafter, the manipulated timer may run (S1250).

The second UE of the CE level 1 may manipulate a timer value by using an offset corresponding to the CE level 1 among the offsets. Thereafter, the manipulated timer may run (S1260). The manipulation may be performed by multiplication, addition, subtraction, and/or division. The manipulated value may be different from each other depending on the CE level of the UE.

Since the CE level of the first UE is higher than the CE level of the second UE, a timer running time of the first UE manipulated by the offset may be longer than a timer running time of the second UE manipulated by the offset.

Figure 13:
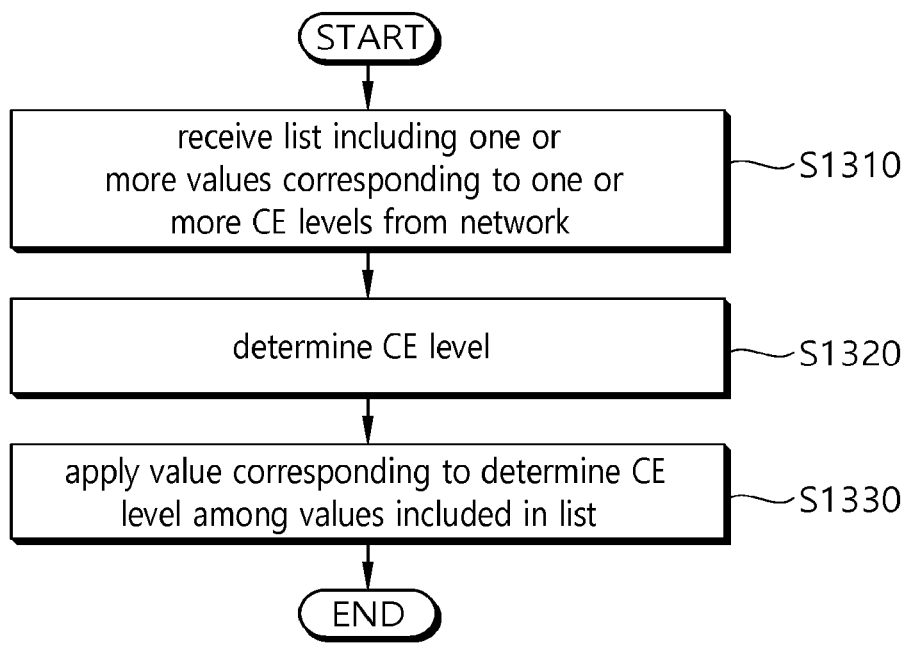
FIG. 13 is a flowchart illustrating a method of applying a value corresponding to a CE level on the basis of the CE level of a UE according to an embodiment of the present invention.

FIG. 13 is a flowchart illustrating a method of applying a value corresponding to a CE level on the basis of the CE level of a UE according to an embodiment of the present invention.

The UE may receive a list including one or more values corresponding to one or more CE levels from a network (S1310).

The list may include a parameter used in a random access procedure. The parameter used in the random access procedure may include at least any one of mac-ContentionResolutionTimer, ra-ResponseWindowSize, and preambleTransMax.

The list may include one or more timer values corresponding to the one or more CE levels. The timer value may be T300. The timer value may be T303. The timer value may be T305. The timer value may be T306. The timer value may be a timer value used by the UE to declare a failure in SIB acquisition. The timer value may be mac-ContentionResolutionTimer. The higher the CE level, the longer the timer value.

The list may include one or more window sizes corresponding to the one or more CE levels. The window size may be ra-ResponseWindowSize. The higher the CE level, the greater the window size.

The list may include one or more maximum counter values corresponding to the one or more CE levels. The maximum counter value may be connEstFailCount. The maximum counter value may be preambleTransMax. The maximum counter value may be maxNumPreambleAttemptCE.

The list may be broadcast from a BS.

The UE may be in an RRC_IDLE state.

The UE may determine the CE level (S1320).

The CE level may be determined by comparing a measured RSRP/RSRQ result and a pre-set threshold. The CE level may be determined by comparing a time for acquiring PSS/SSS and the pre-set threshold. The CE level may be determined by comparing the number of repetitions required to successfully receive a certain downlink message and the pre-set threshold. The CE level may be determined by comparing the number of repetitions required to successfully transmit a certain uplink message and the pre-set threshold.

The UE may apply a value corresponding to the determine CE level among values included in the list (S1330).

The UE may perform a cell attach procedure, a cell re-attach procedure, a random access procedure, or data transmission/reception by using a value corresponding to the applied CE level.

Figure 14:
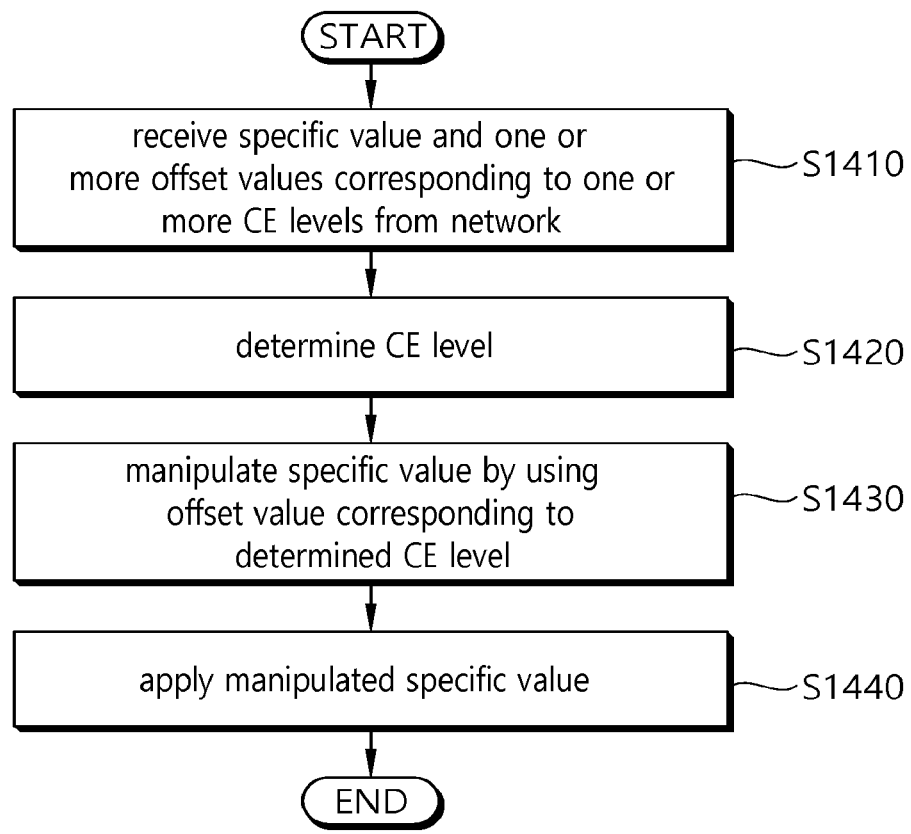
FIG. 14 is a flowchart illustrating a method of applying a value corresponding to a CE level on the basis of the CE level of a UE according to an embodiment of the present invention.

FIG. 14 is a flowchart illustrating a method of applying a value corresponding to a CE level on the basis of the CE level of a UE according to an embodiment of the present invention.

The UE may receive a specific value and one or more offset values corresponding to one or more CE levels from a network (S1410).

The specific value may be any one of a timer value, a window size, and a maximum counter value. The offset value may differ for each of the timer value, the window size, or the maximum counter value. The offset value may differ depending on the CE level of the UE.

The UE may determine the CE level (S1420).

The CE level may be determined by comparing a measured RSRP/RSRQ result and a pre-set threshold. The CE level may be determined by comparing a time for acquiring PSS/SSS and the pre-set threshold. The CE level may be determined by comparing the number of repetitions required to successfully receive a certain downlink message and the pre-set threshold. The CE level may be determined by comparing the number of repetitions required to successfully transmit a certain uplink message and the pre-set threshold.

The UE may manipulate the specific value by using an offset value corresponding to the determined CE level (S1430).

The specific timer value may be any one of the timer value, the window size, and the maximum counter value. The manipulation of the specific value may be performed by multiplication, addition, subtraction, or division.

The UE may apply the manipulated specific value (S1440).

The manipulated specific value may differ from each other according to the CE level. The UE may perform a cell attach procedure, a cell re-attach procedure, a random access procedure, or data transmission/reception by using the manipulated specific value.

Figure 15:
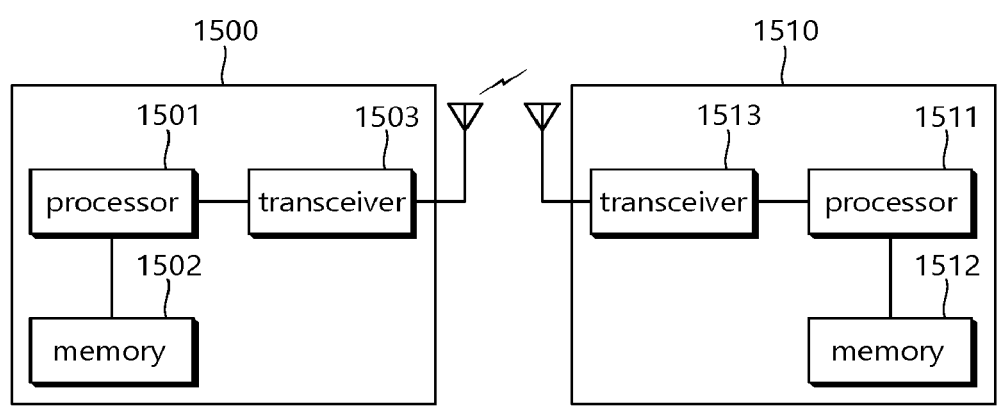
FIG. 15 is a block diagram illustrating a wireless communication system according to the embodiment of the present invention.

FIG. 15 is a block diagram illustrating a wireless communication system according to the embodiment of the present invention.

A BS 1500 includes a processor 1501, a memory 1502 and a transceiver 1503. The memory 1502 is connected to the processor 1501, and stores various information for driving the processor 1501. The transceiver 1503 is connected to the processor 1501, and transmits and/or receives radio signals. The processor 1501 implements proposed functions, processes and/or methods. In the above embodiment, an operation of the base station may be implemented by the processor 1501.

A UE 1510 includes a processor 1511, a memory 1512 and a transceiver 1513. The memory 1512 is connected to the processor 1511, and stores various information for driving the processor 1511. The transceiver 1513 is connected to the processor 1511, and transmits and/or receives radio signals. The processor 1511 implements proposed functions, processes and/or methods. In the above embodiment, an operation of the UE may be implemented by the processor 1511.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method performed by a wireless device in a wireless communication system, the method comprising:
  receiving a plurality of thresholds from a network;
  receiving, from the network, a random access channel (RACH) information for each coverage enhancement (CE) level, wherein the RACH information includes (1) a random access response window size, and (2) a timer for contention resolution;
  performing at least one measurement for a cell;
  determining, among a plurality of CE levels, a CE level based on the plurality of thresholds and results of the performed at least one measurement for the cell,
  wherein the CE level is determined as a CE level 0, based on that the results of the performed at least one measurement for the cell is not less than all of the plurality of thresholds;
  selecting, among the RACH information, (1) a random access response window size corresponding to the CE level 0, and (2) a timer for contention resolution corresponding to the CE level 0; and
  performing a random access procedure with the network based on (1) the selected random access response window size, and (2) the selected timer for contention resolution,
  wherein the random access to the network comprises receiving, from the network, a random access response based on the random access response window size corresponding to the CE level 0.

2. The method of claim 1, wherein the plurality of thresholds are received via system information.

3. The method of claim 1, wherein the at least one measurement comprises a reference signal received power (RSRP) measurement for the cell.

4. The method of claim 3, wherein the at least one measurement further comprises a reference signal received quality (RSRQ) measurement for the cell.

5. The method of claim 1, wherein as the plurality of CE levels are configured with a higher CE level, the longer a timer value is in the timer information.

6. The method of claim 1, wherein the random access to the network comprises,
  receiving, from the network, a contention resolution based on the timer for contention resolution corresponding to the CE level 0.

7. A wireless device in a wireless communication system, the wireless device comprising:
  a memory;
  a transceiver; and a processor operatively coupled to the memory and the transceiver, wherein the processor is configured to:

control the transceiver to receive a plurality of thresholds from a network;

control the transceiver to receive, from the network, a random access channel (RACH) information for each coverage enhancement (CE) level, wherein the RACH information includes (1) a random access response window size, and (2) a timer for contention resolution;

perform at least one measurement for a cell;

determine, among a plurality of coverage enhancement (CE) levels, a CE level based on the plurality of thresholds and results of the performed at least one measurement for the cell, wherein the CE level is determined as a CE level 0, based on that the results of the performed at least one measurement for the cell is not less than all of the plurality of thresholds;

select, among the RACH information, (1) a random access response window size corresponding to the CE level 0, and (2) a timer for contention resolution corresponding to the CE level 0; and perform a random access procedure with the network based on (1) the selected random access response window size, and (2) the selected timer for contention resolution, wherein the random access to the network comprises receiving, from the network, a random access response based on the random access response window size corresponding to the CE level 0.

8. The wireless device of claim 7, wherein the plurality of thresholds are received via system information.

* * * * *